United States Patent
White

(10) Patent No.: US 10,591,090 B2
(45) Date of Patent: Mar. 17, 2020

(54) TOP DRIVE SERVICE LOOP CLAMP WITH TORSIONAL RELIEF

(71) Applicant: NEXANS, Courbevoie (FR)

(72) Inventor: Robert White, Houston, TX (US)

(73) Assignee: NEXANS, Courbevoie (FR)

( * ) Notice: Subject to any disclaimer, the term of this patent is extended or adjusted under 35 U.S.C. 154(b) by 104 days.

(21) Appl. No.: 15/857,023

(22) Filed: Dec. 28, 2017

(65) Prior Publication Data

US 2019/0203854 A1  Jul. 4, 2019

(51) Int. Cl.
| F16L 3/12 | (2006.01) |
| E21B 19/02 | (2006.01) |
| H02G 3/06 | (2006.01) |
| F16L 15/00 | (2006.01) |

(52) U.S. Cl.
CPC ............ *F16L 3/1222* (2013.01); *E21B 19/02* (2013.01); *H02G 3/0666* (2013.01); *F16L 15/008* (2013.01)

(58) Field of Classification Search
CPC ..... F16L 3/1222; F16L 15/008; H02G 3/0666
See application file for complete search history.

(56) References Cited

U.S. PATENT DOCUMENTS

| 6,145,597 A * | 11/2000 | Kobylinski | E21B 17/003 166/369 |
| 6,916,988 B1 * | 7/2005 | Auray | H02G 3/0691 174/665 |
| 7,075,007 B2 * | 7/2006 | Auray | F16L 5/00 174/656 |
| 9,449,737 B2 * | 9/2016 | Little | H01B 9/003 |
| 2009/0151934 A1 * | 6/2009 | Heidecke | E21B 3/02 166/250.01 |
| 2014/0076583 A1 * | 3/2014 | Robichaux | E21B 33/14 166/382 |
| 2015/0318086 A1 * | 11/2015 | Little | H01B 9/003 174/70 R |
| 2017/0338641 A1 | 11/2017 | Komori et al. | |

FOREIGN PATENT DOCUMENTS

| CA | 2 464 045 | 8/1995 |
| CN | 206 250 455 | 6/2017 |
| DE | 25 05 620 | 8/1976 |
| GB | 251960 | 9/1926 |

OTHER PUBLICATIONS

European Search Report dated May 22, 2019.

* cited by examiner

*Primary Examiner* — Anita M King
(74) *Attorney, Agent, or Firm* — Sofer & Haroun, LLP

(57) ABSTRACT

A flange assembly for supporting a cable has a flange for supporting a cable therein. A flange body has one or more lugs disposed about a circumference of said flange body. A retention ring is dimensioned to fit over the flange body and retain the flange assembly by connecting with the lugs.

2 Claims, 17 Drawing Sheets

Power Loop

TOP DRIVE SERVICE LOOP CLAMP WITH TORSIONAL RELIEF

BACKGROUND

Field of the Invention

The present invention relates to a cable assembly for drilling and mining type cables. More particularly, the present invention relates to a cable assembly and torsion relief mount, and method for making the same, for drilling and mining type cables.

Description of Related Art

A dynamic application cable assembly, as differentiated from a static application cable, is one which may be subjected to one or more cyclical or continual forces such as bending, twisting, tension, compression, thermal loading, external pressure, and the like.

Examples of such dynamic cable assemblies include top drive service loop cable assemblies for drilling rigs, bridle cable assemblies used on offshore tender vessels, and shuttle car cable assemblies used in mining operations. FIG. 1 shows a typical top drive service loop arrangement where a top drive service loop cable 1000 connects between two supports 1003A and 1003B, one located on the top drive equipment 1002 and the other on the derrick 1004 (for further connection to power and control equipment). These large dynamic application cables 1000 shown in FIGS. 2-3 typically include a combination of electrical wires, hydraulic lines and fiber optic cables 1006. For protection, the cables are fitted into a large diameter rubber hose 1008 which is often reinforced with steel wires or synthetic fibers 1009. Within this hose there is typically a potting material 1010 to support the cable components against the inside diameter of the hose as shown for example in the prior art FIGS. 2 and 3.

However, such designs are very heavy and relatively inflexible. In addition, they typically have a large outer diameter which often limits the effective bending radius of the assembly. While the prior art designs are workable, they are not ideal for the dynamic applications in which they are used. These cable assemblies are repeatedly subjected to moving forces, particularly bending and flexing, in which the size, weight, and relative stiffness of the assembly often limits its effective run life. Since the cable assembly is a vital link in the operation, top drive cable failure is costly, especially in drilling and mining operations where this translates into lost production, and typically hundreds of thousands of dollars per day in lost revenues.

Additionally, these designs are generally not field-repairable and in most cases the cable assembly must be replaced when it is damaged. This has the potential impact of extending the down-time of the operation even further.

One prior art solution to the traditional potted hose method outlined above is to provide a dynamic application cable assembly, including a cable and connection arrangement that incorporates several improved design features that collectively work to support not only the weight of the cable but also the dynamic loads experienced by the cable assembly without the need for the potted hose design.

Such an arrangement may include a double-thick inner cable jacket with reinforced aramid fibers designed to carry the entire assembly load. For example, the jacket thickness for drilling cables is equal to or greater than twice the thickness specified for such cables according to IEEE 1580, entitled "Recommended Practice for Marine Cable for Use on Shipboard and Fixed or Floating Facilities," incorporated herein by reference. The arrangement further includes a high-strength, high-dielectric resin chemically bonded to the inner jacket of the cable as well as to the assembly support flange. An overall metallic armor provides both secondary cable support and electrical grounding. A braid shielding for power cables provides a unique grounding arrangement within flange body itself.

Such an arrangement can include a cable and flange assembly having at least one cable and at least one flange. The cable has an armor, a jacket and at least one conductor element therein. The flange includes a flange body, an armor retainer and a grommet holder. The armor of the cable is configured to be secured to the flange via the armor retainer.

For example FIGS. 4A and 4B illustrate such a prior art flange 2000 having a flange body 2002, an armor retainer 2004, a grommet holder 2006, socket head cap screws 2008, a rubber grommet 2010, a shield terminator 2012, and a polymer fill port 2014.

Although this flange design is an improvement over the potted hose arrangement, owing to the cable and flange's operation as a top drive service loop cable there are still continual forces such as bending, twisting, tension, compression, thermal loading, external pressure, and the like acting on the connection point between the flange body of the flange as it connects with the equipment elements.

For example, despite the use of such improved flange assemblies as shown in FIGS. 4A and 4B, the flange body itself is dimensioned to replicate a standard pipe flange. The connected service loop cables experience many forces, both internal and external, during operation, which can result in "corkscrewing" as a result of trapped torsion within the cable. These forces can often lead to failure of the cable connection or cable conductors.

Additionally, all prior art flanges, including those described above, still require that the flanges be properly aligned with their respective bolt holes on both sides (i.e. at both supports on either end of the cable). These bolt holes on the flanges and the respective supports are separated by long distances of 20-40 m, making it difficult to achieve connection without adjusting or twisting the cable. By fixing these end flanges to their respective supports as shown for example in FIG. 1, even slightly improper alignments, can induce torsional forces onto the cable assembly, which when subjected to dynamic forces during the top drive operation, can result in premature failure of the assembly.

OBJECTS AND SUMMARY

The present arrangement corrects these issues by altering the shape of the flange body to include a plurality of circumferentially radiating lugs each spanning a given radial amount about the circumference of the flange body.

In one embodiment a separate metal retaining ring is correspondingly constructed with lug retention slots, each spaning at least the same or a somewhat circumferentially larger amount of the circumference of the flange body than the lugs. The metal retaining ring is adapted to be fit onto the flange body with the lugs positioned with the lug slots and then the metal retention ring is attached or bolted to the support on either the top drive or derrick/platform. The metal retention ring is dimensioned, along with its lug slots to hold the flange body of the flange tightly against the support, thus supporting the full weight of the top drive service cable. Additionally, because the lug slots have a greater circumferential opening or span than the lugs of the flange body, the flange body may torsionally rotate against the support and within the metal retention ring (i.e. during top drive operation) while the metal retention ring continues to support the flange.

In one embodiment the metal retaining ring is employed to attach the flange to a standard pipe flange bracket. Alternatively, a custom bracket may be employed with pre-machined lug slots as described above.

BRIEF DESCRIPTION OF THE DRAWINGS

The present invention can be best understood through the following description and accompanying drawings, wherein.

DETAILED DESECRATION

Figure 1:
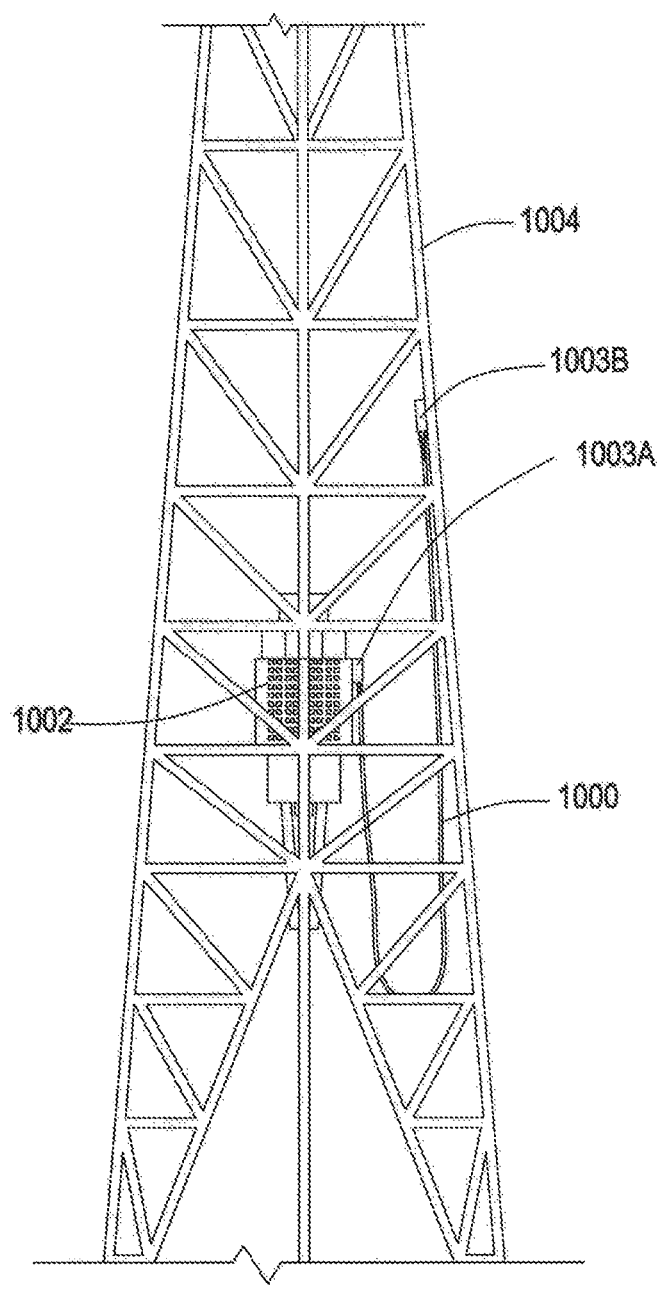
FIG. 1 is an image of a prior art of a top drive service loop.
Figure 2:
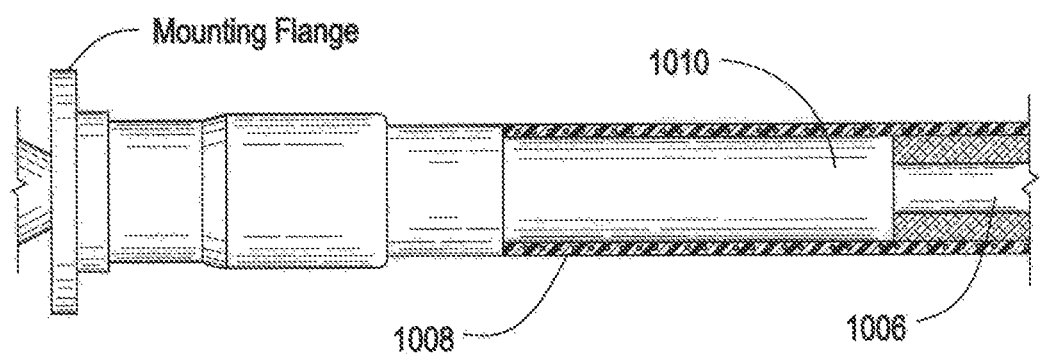
FIG. 2 is an image of a prior art top drive service loop cable.
Figure 3:
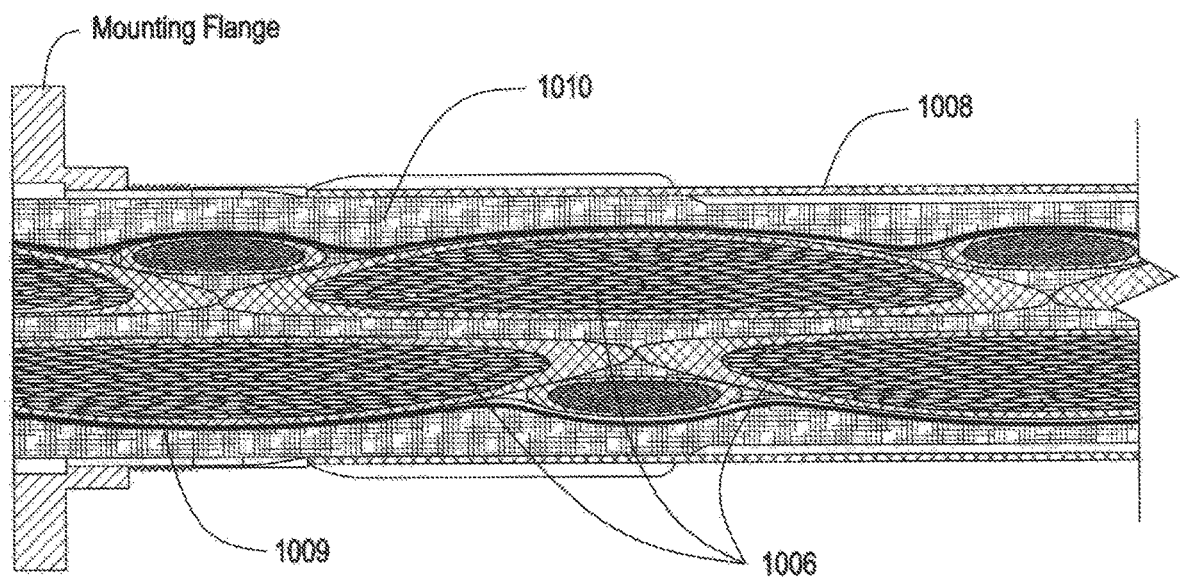
FIG. 3 is an image of a prior art top drive service loop cable.
Figure 4A:
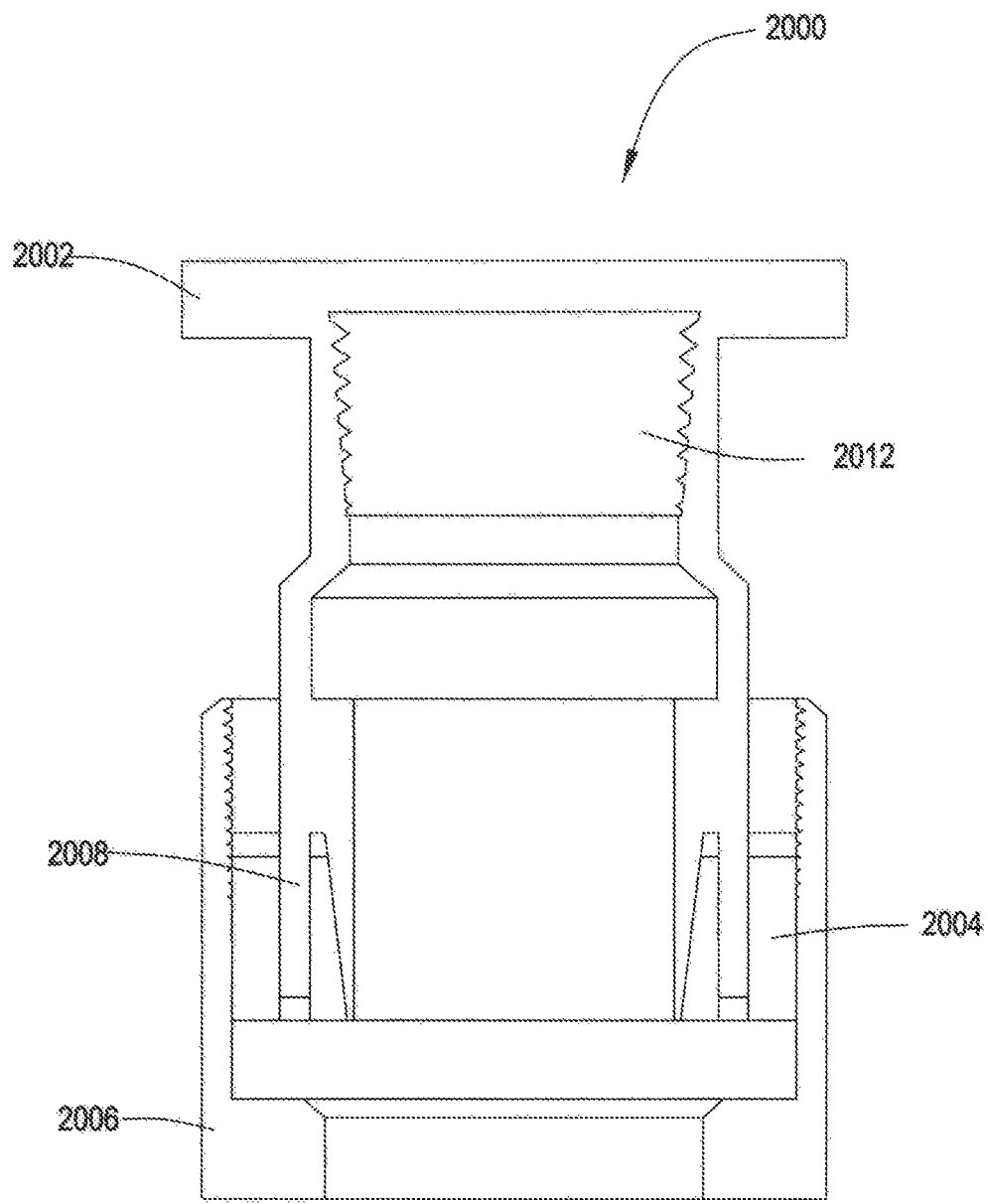
FIGS. 4A and 4B are images of a prior art top drive service loop cable flange.
Figure 4B:
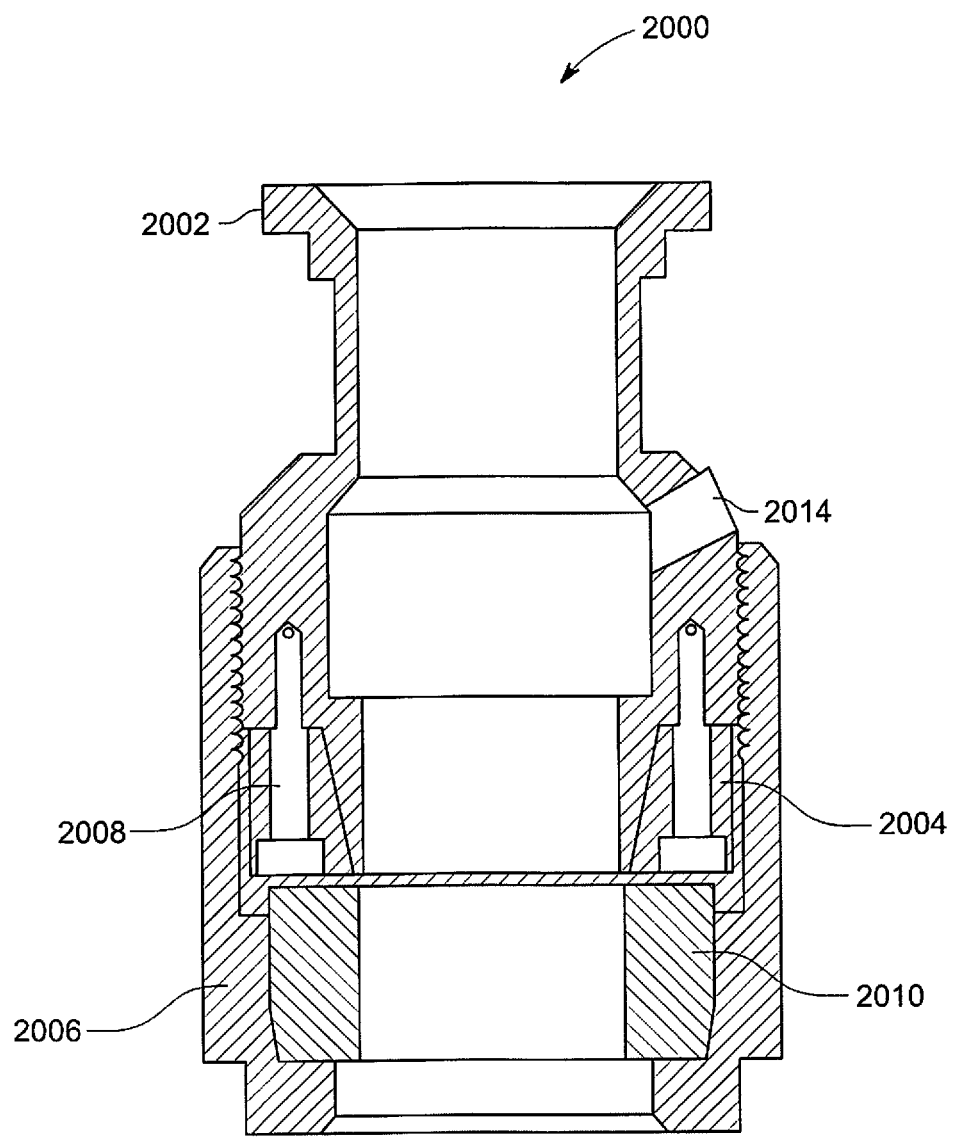
Figure 5A:
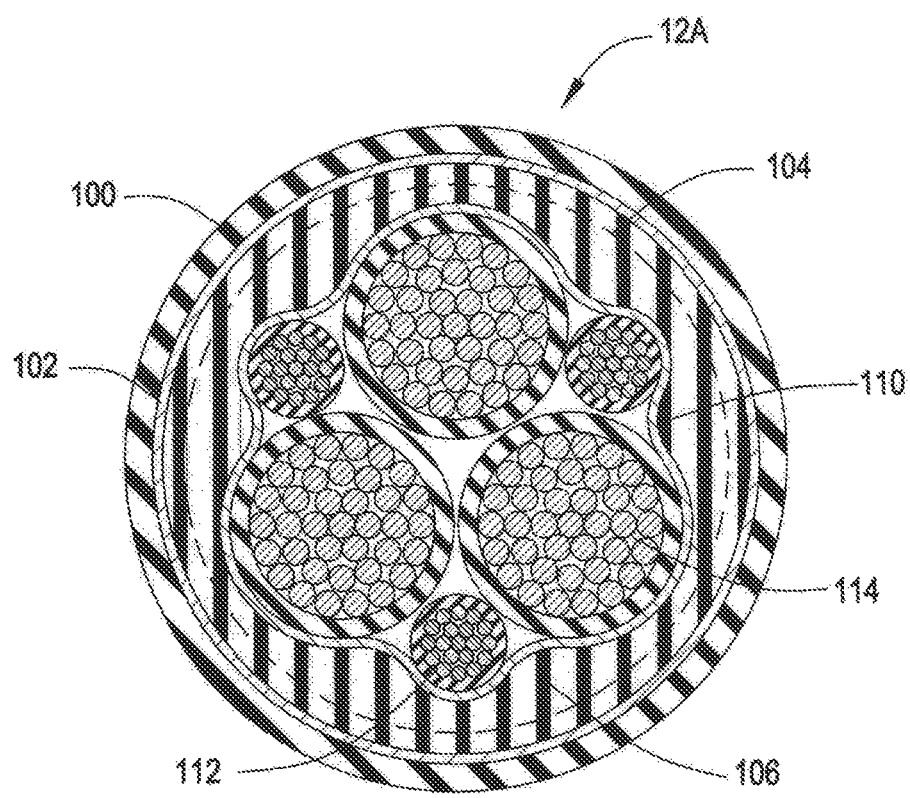
FIGS. 5A-5C are images of a top drive service loop cable in accordance with one embodiment.
Figure 5B:
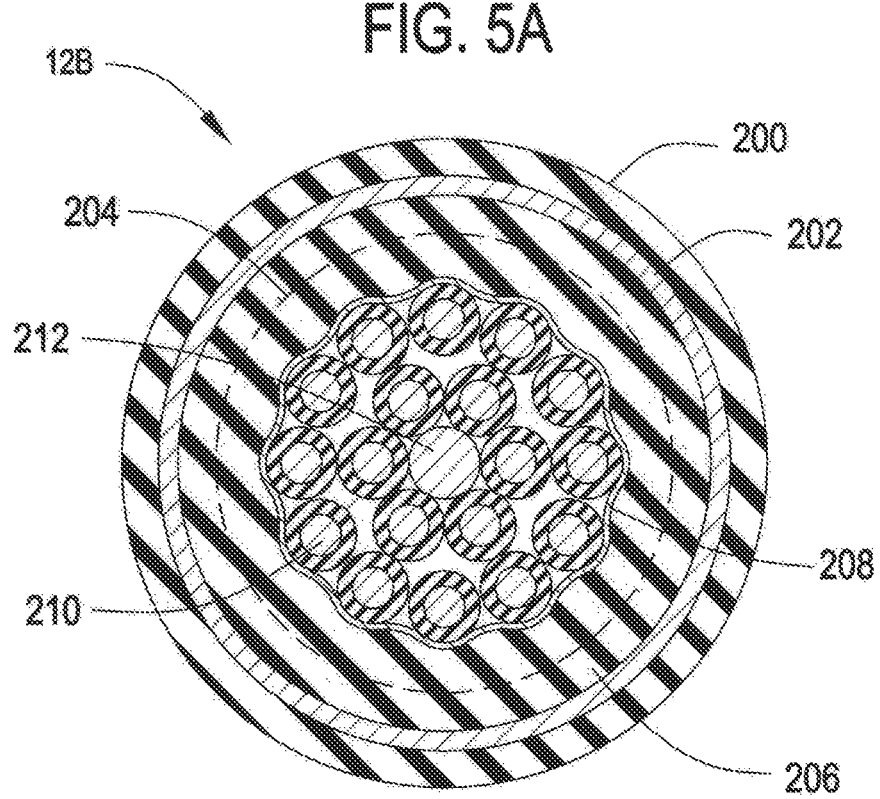
Figure 5C:
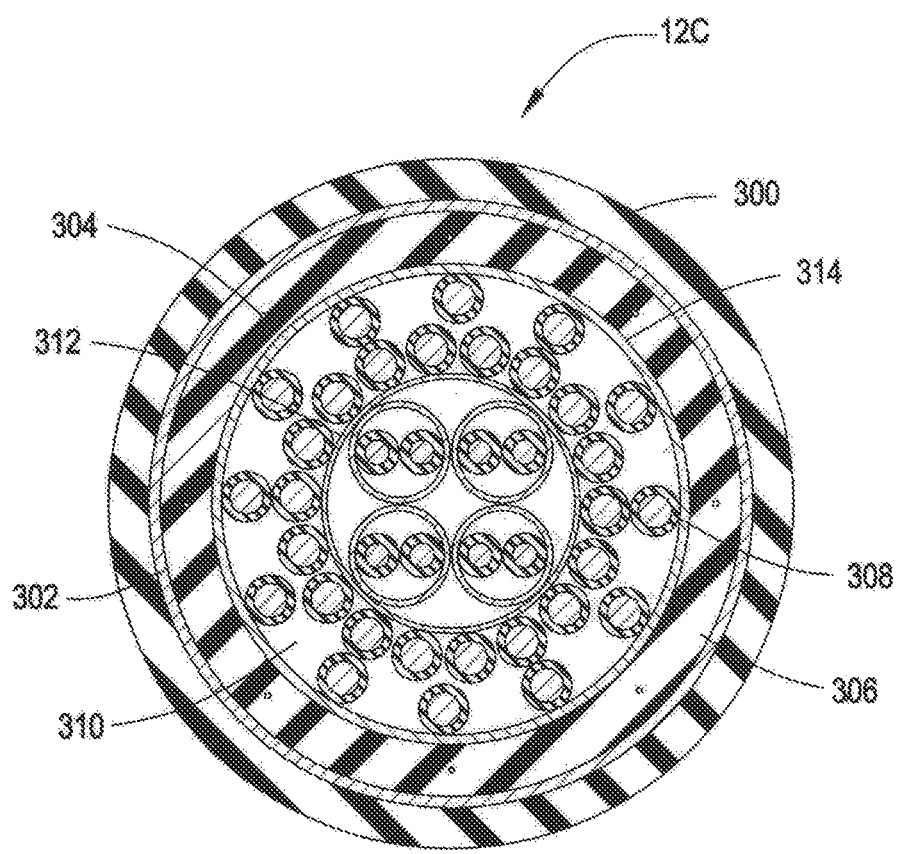

Beginning with the structure of the top drive service loop cables, cables 12A-12C, FIGS. 5A-5C show the exemplary basic structure top drive service cables used with a flange configured in accordance with various embodiments of the present invention.

FIG. 5A illustrates an exemplary power cable 12A that includes an outer sheath 100, armoring 102, and a reinforcement layer 104 within jacket 106. Inside of jacket 106, power cable 12A has a shielding 110, encompassing the entirety of the conducting elements. For example, inside shielding 110, there are primary ground wires 112 and conductors 114 (777KCMIL 1/C—Kilo circular mils) forming the core of cable 12A.

As shown in FIG. 5B, the basic structure of control cable 12B, includes an outer sheath 200, armoring 202, and a reinforcement layer 204 within inner jacket 206. Inside of inner jacket 206, cable 12B has a core binder 208 having a group of insulated conductors 210 and a central filler 212.

As shown in FIG. 5C, the basic structure of auxiliary/instruments cable 12C, includes an outer sheath 300, armor 302, and a reinforcement layer 304 within inner jacket 306.

Inside of inner jacket 306, cable 12C has a series of electrical conductors 308, filler 310 and a central set of twisted pair communication cables 312 all held within binder 314.

In one embodiment, the present arrangement employs a different material for its armor than the prior art which is usually the standard armor of bronze or tinned copper. In one arrangement armor 102, 202 and 302 is constructed from 316 type stainless steel (standard molybdenum-bearing grade, austenitic stainless steel). Stainless steel armor such as 102, 202 and 302 serve three purposes: First, it protects cables 12A-12C from external damage. Second, it is designed in such a way that it also independently supports the weight of cables 12A-12C, along with a generous safety factor, when properly secured. Third, it guards against Electromagnetic Interference (EMI) when primary shielding is not provided between adjacent cables, when properly grounded electrically.

In accordance with one embodiment, the cables 12A-12C work together with flange (described below) to create a durable cable which stands up to multiple flexations typically seen in dynamic applications such as on top drive service loops 11. Inner jackets 106, 206, 306 of each of cables 12A-12C is greater than or equal to the thickness specified for such cables according to standard IEEE 1580, and includes an aramid fiber reinforcement 104, 204, 304. According to this arrangement, when cables 12A-12C and their corresponding jackets 106, 206, 306 are properly secured to flanges 16, this reinforcement along with the thick jackets 106, 206, 306 allow the entire weight of cables 12A-12C to be supported by jackets 106, 206, 306, with a generous safety factor.

Figure 6A:
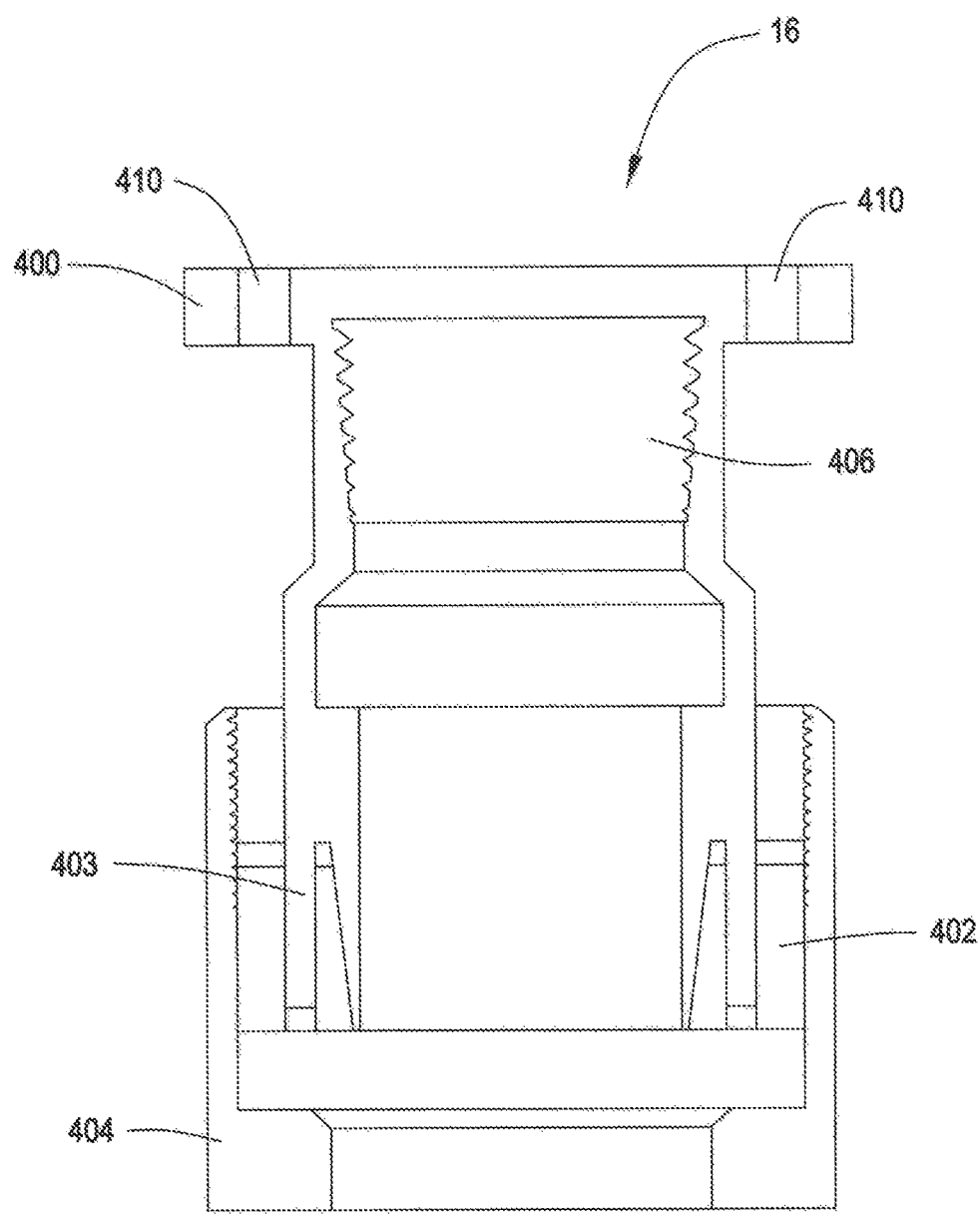
FIGS. 6A and 6B are images of a top drive service loop cable flange in accordance with one embodiment.
Figure 6B:
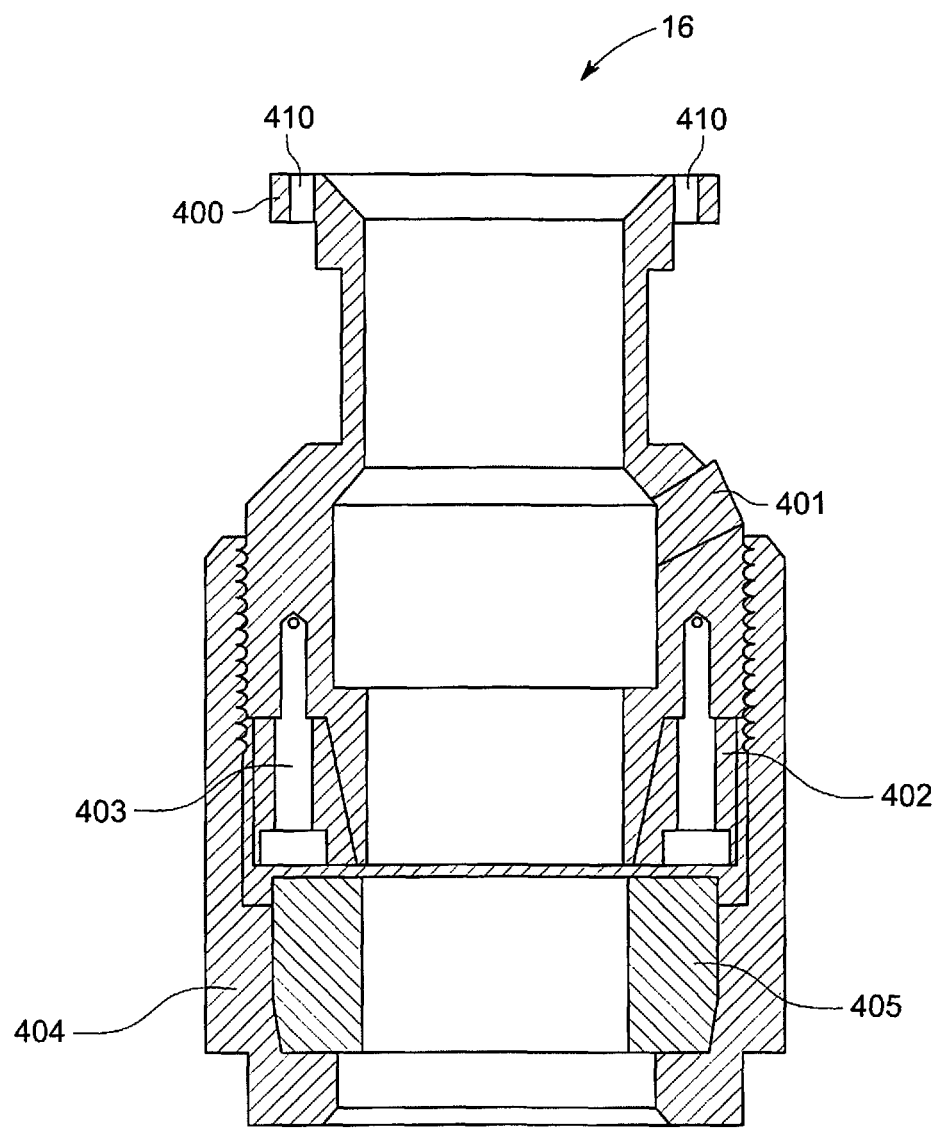

FIGS. 6A and 6B each illustrate a flange 16 (FIG. 6A showing compression of the grommet 405) in accordance with one embodiment of the invention. Flange 16 has a flange body 400, armor retainer 402, and grommet holder 404. Flange body 400, while varying in dimensions for different cables 12A-12C serves the basic function of enabling inner jackets 106, 206, 306 of cables 12A-12C to be supported by means of a polymer bonding agent added through fill port 401 (FIG. 6B), The polymer bonding agent is designed to bond chemically with cable jackets such as 106, 206, 306. Flange body 400 has a void which, when filled with the polymer bonding agent, geometrically prevents cable 12 from being pulled through flange body 400 since the cured polymer gets bonded to cable jackets such as 106, 206, 306.

Armor retainer 402 serves a dual purpose in each flange 16. First, armor retainer 402, works to secure stainless steel armors such as 102, 202, 302 so that the weight of cables 12A-12C may be supported by the stainless steel armor. Second, armor retainer 402 acts as an electrical ground path between stainless steel armor 102, 202, 302 and flange 16. Armor retainer 402 is secured to flange body 400 by means of socket head cap screws 403.

Grommet holder 404 of flange 16, when screwed on to flange body 400, compresses a rubber grommet 405 (FIG. 6B) which then creates a seal within the interior of flange body 400. This not only prevents the ingress of water into flange 16 but also prevents the polymer bonding agent from escaping during the pouring and subsequent curing process.

In one arrangement, flange 16 for power cable 12A has one additional item, namely a shield terminator 406. Shield terminator 406 secures shielding 110 of power cable 12A, which is typically created from tinned copper braid, and allows for a second electrical path for EMI shielding.

Flange 16 may be advantageously made from a variety of materials depending on the application. High strength steel is typically used for land based applications (ASTM (American Society, for Testing and Materials) standards such as—A675, GR 70, 4140 HT, etc.—incorporated herein by reference), and stainless steel is predominantly used for applications where corrosion resistance is required (AISI (American Iron and Steel Institute) standards such as 316, AISI 304, etc—incorporated herein by reference).

Once the polymer cures and sets up within flange 16 and also chemically bonds to the jackets such as 106, 206, 306 surrounding each of the individual conductors within cables 12A-12C, this additional support from the cured polymer is capable of independently supporting all cables 12A-12C within the entire cable assembly even if the stainless steel armor system were to fail.

Figure 7:
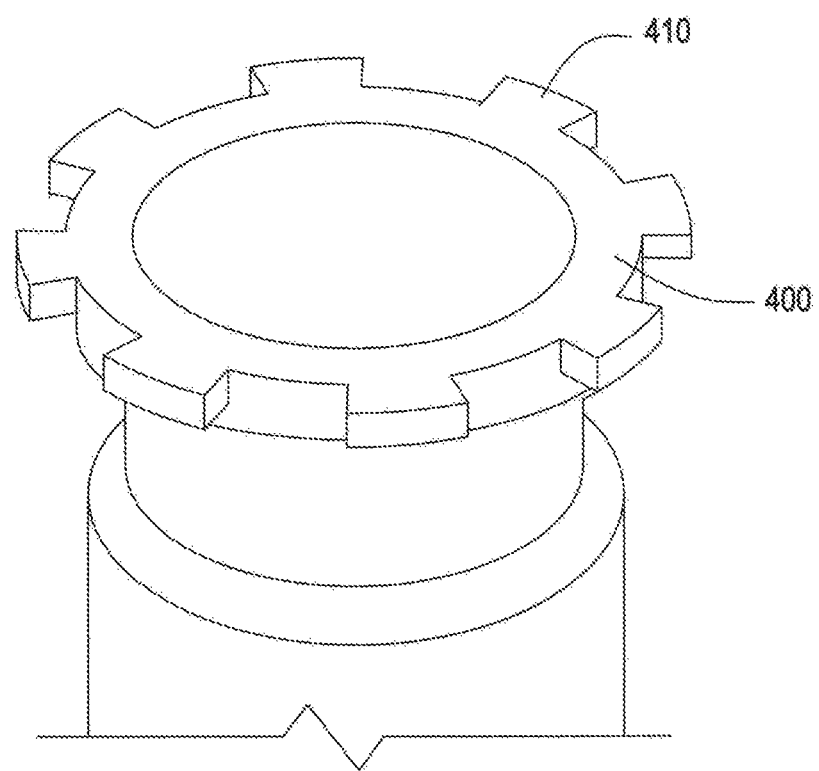
FIG. 7 is an image of a flange body with lugs in accordance with one embodiment.

Turning to the torsional relief aspect, flange body 400 is shown in FIG. 7 with a series of lugs 410 in accordance with one embodiment. It is noted that lugs 410 and the related features described hereinafter may be used on a flange 16 as shown in FIGS. 6A and 6B, or alternatively on other flanges used in top drive service loops. To the extent such features of lugs 410 are described in connection with flange 16 the structure of flange 16 is considered exemplary.

Figure 8:
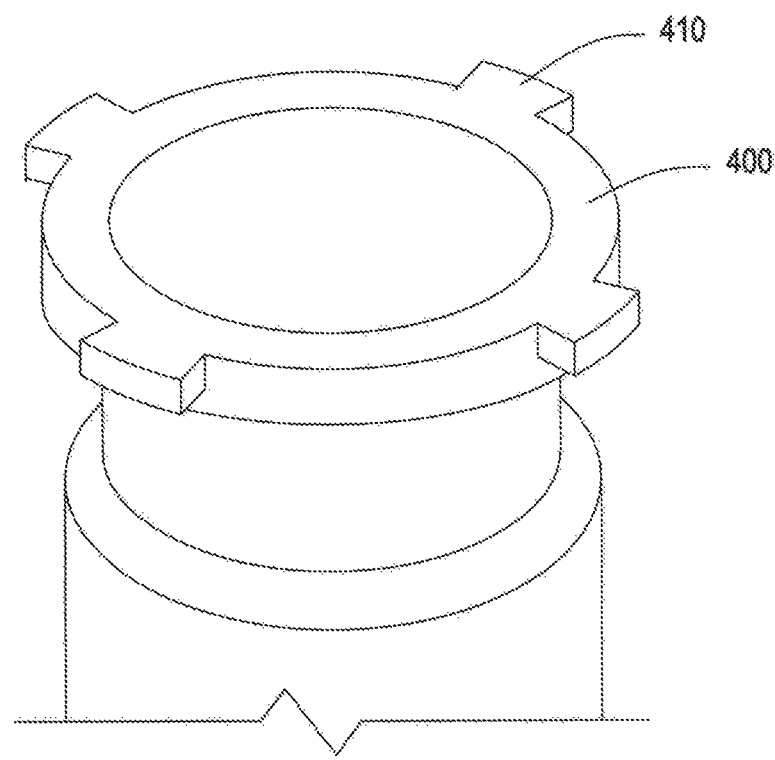
FIG. 8 is an image of a flange body with lugs in accordance with one embodiment.
Figure 9:
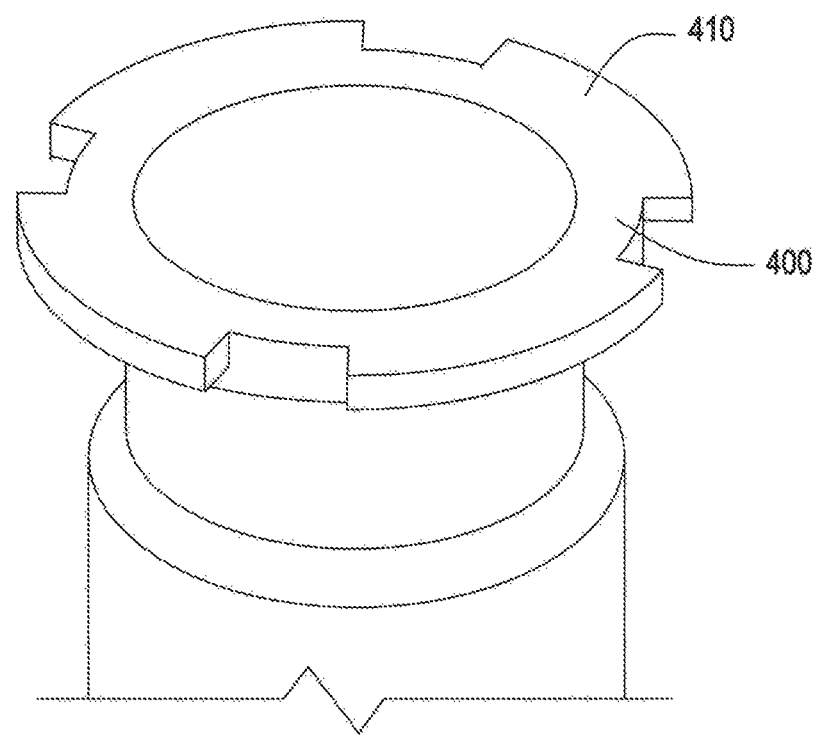
FIG. 9 is an image of a flange body with lugs in accordance with one embodiment.

In accordance with one embodiment, as illustrated in FIG. 7, a flange body 400 maintains a series of lugs 410. In the illustrated instance the number of lugs 410 may be eight, each with an arc width of 20°. In another embodiment as shown in FIG. 8, lugs 410 are of the same size (20°), but they are only four lugs 410 present on the flange body 400. In another embodiment as shown in FIG. 9, flange body 400 also has four lugs 410, but they are larger, e.g. 80°, covering a greater circumferential area.

The size/circumferential arc of lugs 410 may be a matter of design depending on the desired expected weight load of the top drive service loop cable, as well as the degree of torsional freedom desired, as described below.

Figure 10:
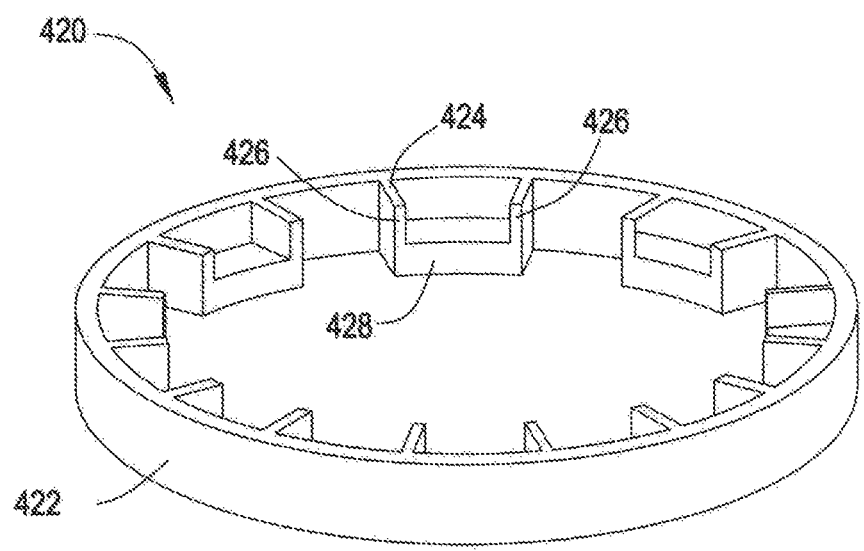
FIG. 10 is an image of a flange body retention ring with lug retention elements in accordance with one embodiment.

To connect flange body 400 and lugs 410 to the support on the derrick or top drive service equipment, a metal retention ring 420 is used as shown in FIG. 10. The retention ring is constructed of a similar material as the flange body 400, such as 4140 HT steel.

Retention ring 420 has an outer ring 422 and a series of lug retention elements 424. Lug retention elements 424 have side walls 426 and a bottom lug retainer 428. In accordance with one embodiment, retention ring 420 includes a corresponding number of lug retention elements to match the number of lugs 410 in flange body 400. For example, retention ring 420 shown in FIG. 10 has eight lug retention elements 424 corresponding for example to the eight lugs 410 on flange body 400 shown in FIG. 7.

Figure 11:
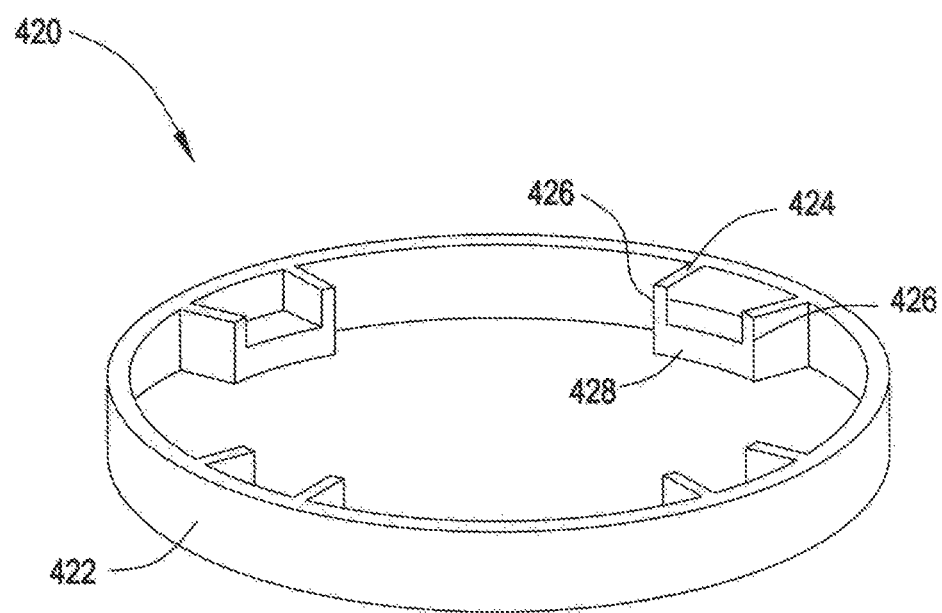
FIG. 11 is an image of a flange body retention ring with lug retention elements in accordance with one embodiment.

FIG. 11 shows retention ring 420 with four lug retention elements 424 corresponding for example to the four lugs 410 on flange body 400 shown in FIG. 8.

Figure 12:
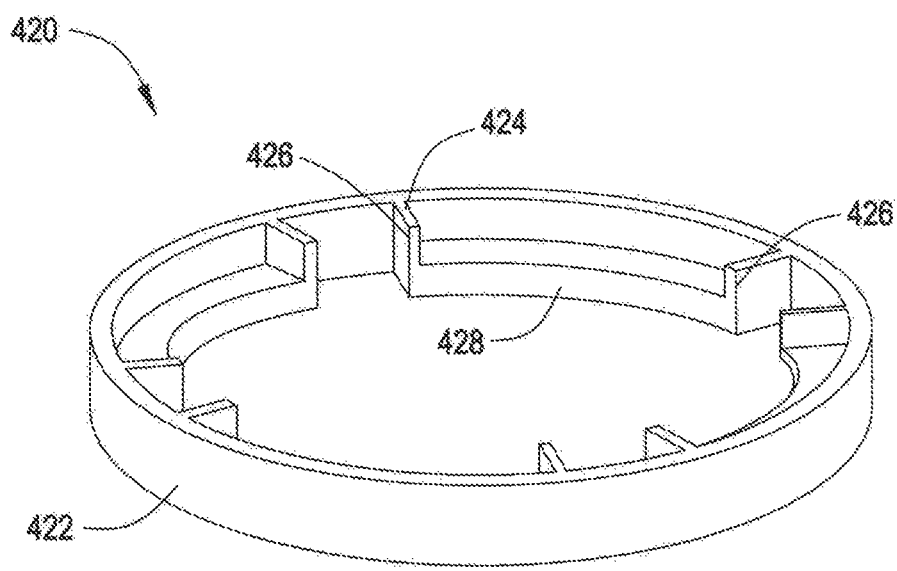
FIG. 12 is an image of a flange body retention ring with lug retention elements in accordance with one embodiment.

FIG. 12 shows retention ring 420 with four larger lug retention elements 424 corresponding for example to the four larger lugs 410 on flange body 400 shown in FIG. 9.

In each arrangement lugs 410 preferably have some rotational/torsional freedom as the two walls 426 of lug retention elements 424 are spaced farther apart than the arc size of the corresponding lugs 410. For example, if lugs 410 span an arc of 20° and lug retention elements 424 have walls 426 that span 30°, then flange body 400 and lugs 410 would have 10° (+/−5°) of torsional freedom. If lug retention elements 424 have walls 426 than span 40°, using the same 20° lugs 410 then flange body 400 and lugs 410 would have 20° (+/−10°) of torsional freedom. The amount of torsional freedom that is desired can be adjusted down to 0° of freedom (walls 426 spaced to the exact size of lugs 410) and up to 360° (+/−180°) is desired (ring 420 having one retention element 424 with no walls 426 and one large lug retainer 428). However, typically lugs 410 preferable have between 10° (+/−5°)–40° (+/−20°) of freedom within lug retainers. The amount of torsional freedom may be a matter of design depending on the desired expected weight load of the top drive service loop cable, and torsional flexibility of the cable.

Figure 13:
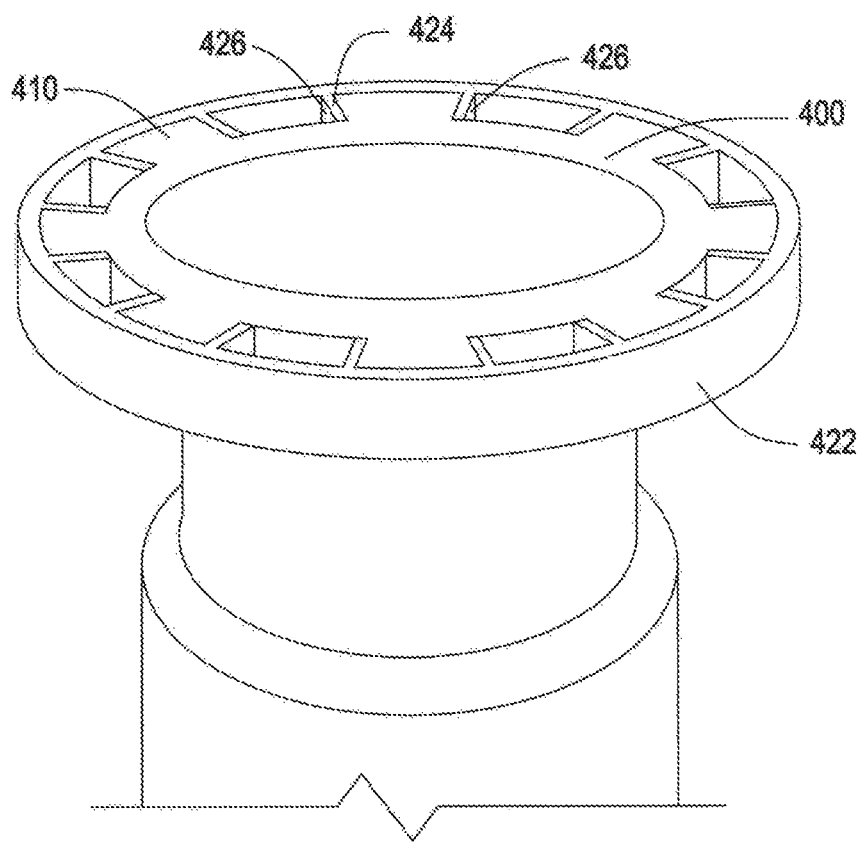
FIG. 13 is an image of a flange body with lugs in a flange body retention ring with lug retention elements in accordance with one embodiment.

FIG. 13 shows flange 400 with lugs 410 and the retention ring 420 fitted thereover with lugs 410 contained within lug retention members 424. Retention ring 420 may then be bolted to the derrick or top drive support, preferably in the area between lug retention elements 424.

Figure 14:
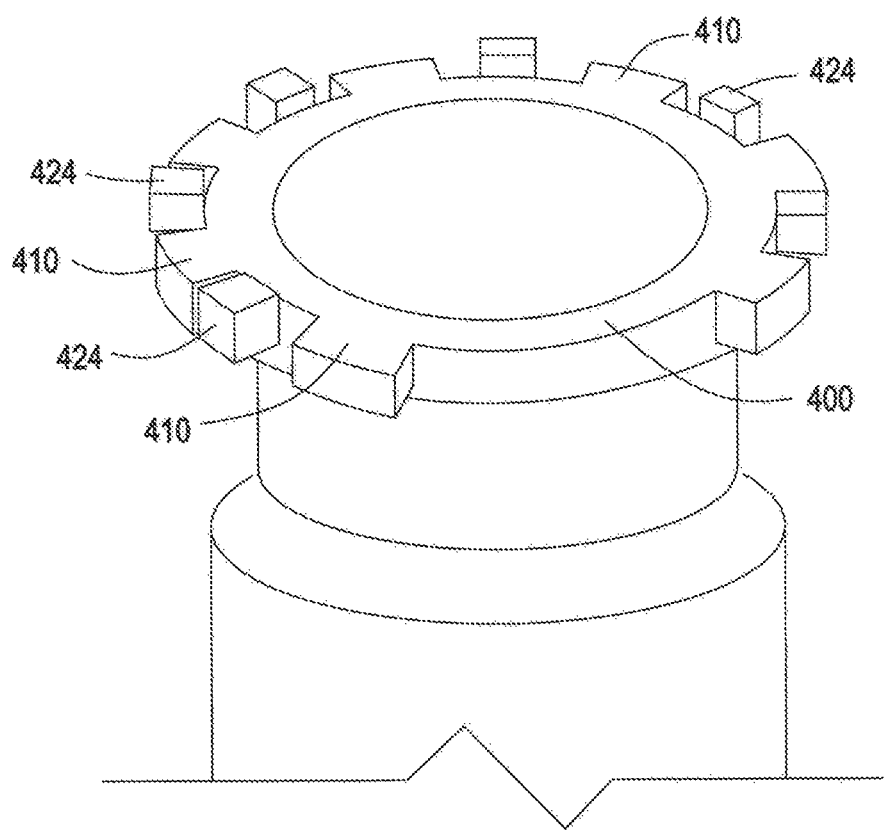
FIG. 14 is an image of a flange body with lugs in a support with lug retention elements in accordance with one embodiment.

In another embodiment as shown in FIG. 14, instead of using a separate retention ring 420 fitted over lugs 410 and flange body 400, lug retention elements 424 may be directly formed in similar style into a support 500 such as the support on a derrick or top drive equipment. After lugs 410 are fitted into lug retention elements 424 with support 500, in one arrangement a cap 502 may be placed over flange body 400 and bolted to support 500, locking flange body 400 and lugs 410 into their respective lug retention elements 420. In another arrangement, retention elements 424 may be on the inside of support 500 (as shown in FIG. 14) and thus cap 502 is not needed as flange body 400 is larger than the opening in support 500.

Essentially, this arrangement has the same function as flange retention ring 420, but builds its feature of lug retention members 424 directly into a custom support 500 (whereas flange retention ring 420 shown in FIG. 13 can be used on existing/regular top drive service loop cable attachment supports).

Owing to the above arrangement as described, as the top drive moves within the derrick, and as the top drive service loop cable correspondingly moves, the connection to the derrick support and the top drive support allows for torsional movement of the flange/connection point. As such, unlike the prior art where such torsional strains are imparted to the flange and cable elements, in the present arrangement, lugs 410 move within lug retention elements 420 with a given amount of rotational freedom. This absorbs some or all of the torsional stress imparted into the cable by the movement of the top drive within the derrick, without imparting it to the cable or flange elements extending the life of the cable and connection.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A flange assembly for supporting a cable, comprising:
a flange for supporting a cable therein;
a flange body having one or more lugs disposed about a circumference of said flange body; and
a retention ring dimensioned to fit over said flange body and retain said flange assembly by connecting with said lugs, wherein said retention ring has one or more lug retention elements corresponding to said one or more lugs,
wherein each said lugs, each have a first dimension spanning an arc of the circumference of the flange body and each of said lug retention elements each have a corresponding first dimension spanning an arc of the retention ring, wherein the first dimension spanning an arc of the circumference of the flange body of said lugs is smaller than the corresponding first dimension spanning the arc of the retention ring of said lug retention elements, allowing radial movement of said lugs within said lug retention elements.

2. The flange assembly as claimed in claim 1, wherein said flange body has a plurality of lugs and lug retention elements.

* * * * *